US010120808B2

(12) United States Patent
Kiss et al.

(10) Patent No.: US 10,120,808 B2
(45) Date of Patent: Nov. 6, 2018

(54) APPARATUS HAVING CACHE MEMORY DISPOSED IN A MEMORY TRANSACTION PATH BETWEEN INTERCONNECT CIRCUITRY AND A NON-VOLATILE MEMORY, AND CORRESPONDING METHOD

(71) Applicant: ARM LIMITED, Cambridge (GB)

(72) Inventors: Gergely Kiss, Budapest (HU); Gábor Móricz, Pest (HU); Man Cheung Joseph Yiu, Hinxton (GB)

(73) Assignee: ARM Limited, Cambridge (GB)

( * ) Notice: Subject to any disclaimer, the term of this patent is extended or adjusted under 35 U.S.C. 154(b) by 204 days.

(21) Appl. No.: 15/135,916

(22) Filed: Apr. 22, 2016

(65) Prior Publication Data

US 2017/0308478 A1  Oct. 26, 2017

(51) Int. Cl.
G06F 13/36 (2006.01)
G06F 12/0879 (2016.01)
G06F 13/28 (2006.01)
G06F 12/0893 (2016.01)

(52) U.S. Cl.
CPC ...... *G06F 12/0879* (2013.01); *G06F 12/0893* (2013.01); *G06F 13/28* (2013.01); *G06F 2212/6032* (2013.04)

(58) Field of Classification Search
CPC .. G06F 12/0879; G06F 13/28; G06F 12/0893; G06F 2212/6032
See application file for complete search history.

(56) References Cited

U.S. PATENT DOCUMENTS 5,530,829 A * 6/1996 Beardsley ........... G06F 12/0866
711/113
5,678,020 A * 10/1997 Singh .................. G06F 12/0897
711/100
6,243,795 B1 * 6/2001 Yang ................... G06F 11/1666
160/113

(Continued)

FOREIGN PATENT DOCUMENTS

WO WO 2017/010004 1/2017

OTHER PUBLICATIONS

"AXI4 to AHB-Lite Bridge v3.0" by XILINX, Nov. 18, 2015.*
UK Combined Search and Examination Report datd Jul. 27, 2017 in GB 1702075.1, 9 pages.

Primary Examiner — Jing-Yih Shyu
(74) Attorney, Agent, or Firm — Nixon & Vanderhye P.C.

(57) ABSTRACT

A data processing system includes interconnect circuitry providing a plurality of memory transaction paths between one or more transaction masters, including a processor, debugging circuitry and a DMA unit, and one or more transaction slaves including a non-volatile memory, a DRAM memory and an I/O interface. A cache memory is provided between the interconnect circuitry and the non-volatile memory. This cache memory may be a two way set associative cache memory. The cache memory may serve as a read-only cache memory. A cache miss will result in a line fill of a cache line including the target data which was missed. If prefetching is enabled for the cache memory and the transaction was attempting to read a program instruction, then a prefetch operation may be performed in which a further contiguous cache line of data is also fetched into the cache memory upon the cache miss.

18 Claims, 2 Drawing Sheets

(56) References Cited

U.S. PATENT DOCUMENTS

Figure 1:
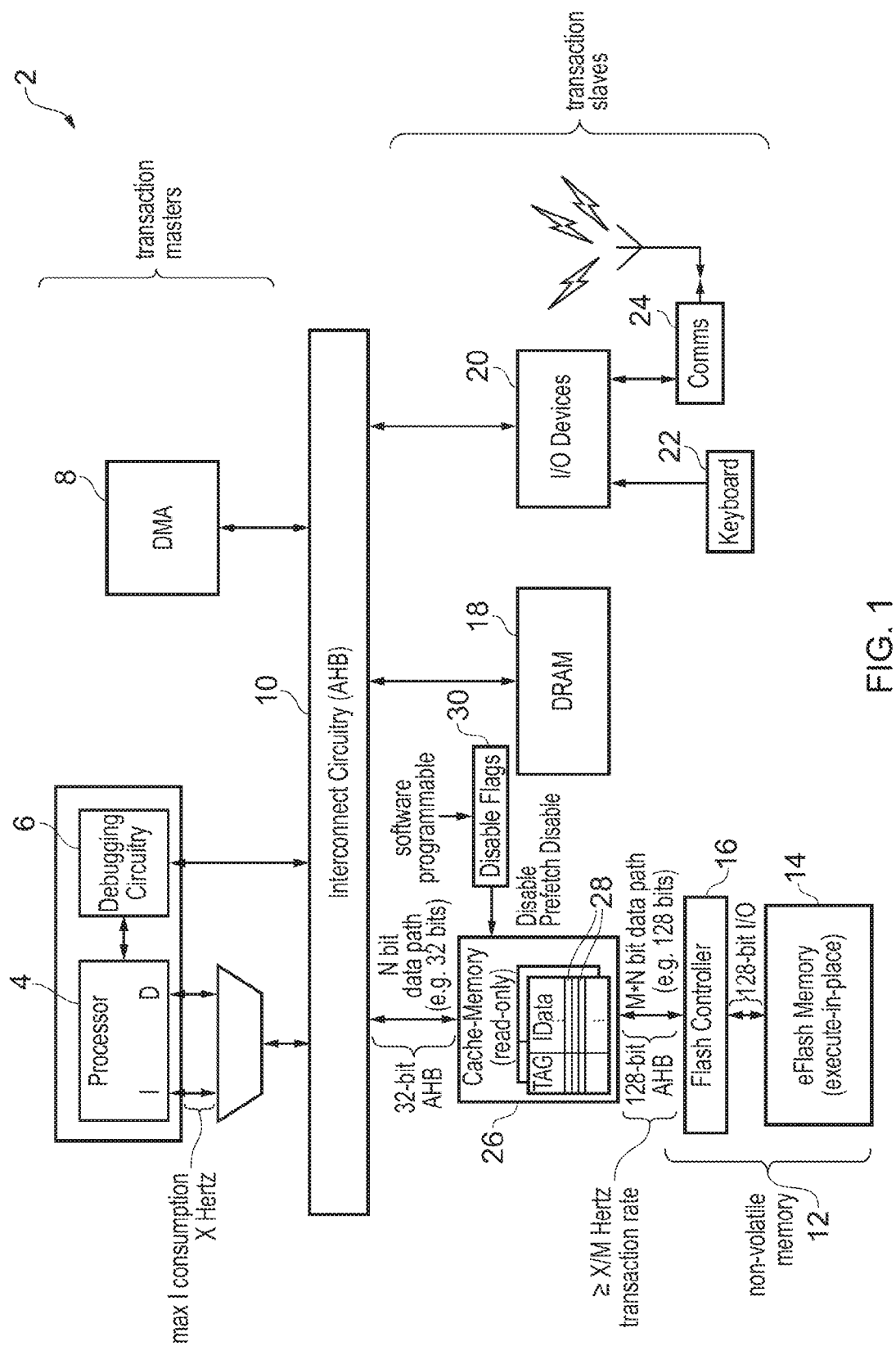

| | | | |
|---|---|---|---|
| 2002/0078292 A1* | 6/2002 | Chilton | G06F 12/0866 |
| | | | 710/305 |
| 2003/0135729 A1 | 7/2003 | Mason, Jr. et al. | |
| 2005/0195635 A1 | 9/2005 | Conley et al. | |
| 2009/0157974 A1* | 6/2009 | Lasser | G06F 12/0884 |
| | | | 711/135 |
| 2010/0057984 A1* | 3/2010 | Chen | G06F 12/0804 |
| | | | 711/113 |
| 2010/0058087 A1* | 3/2010 | Borras | G06F 1/3203 |
| | | | 713/322 |
| 2011/0167223 A1* | 7/2011 | Isono | G06F 12/0879 |
| | | | 711/119 |
| 2011/0219167 A1 | 9/2011 | Klein | |
| 2012/0054421 A1* | 3/2012 | Hiratsuka | G06F 12/0246 |
| | | | 711/103 |
| 2012/0151134 A1* | 6/2012 | Friendshuh | G06F 12/0868 |
| | | | 711/113 |
| 2014/0068175 A1* | 3/2014 | Kaplan | G06F 12/1027 |
| | | | 711/108 |
| 2015/0293850 A1* | 10/2015 | Shindo | G06F 12/0862 |
| | | | 711/137 |
| 2016/0077968 A1* | 3/2016 | Sela | G06F 12/0246 |
| | | | 711/118 |

\* cited by examiner

APPARATUS HAVING CACHE MEMORY DISPOSED IN A MEMORY TRANSACTION PATH BETWEEN INTERCONNECT CIRCUITRY AND A NON-VOLATILE MEMORY, AND CORRESPONDING METHOD

BACKGROUND

Field

This disclosure relates to data processing systems. More particularly, this disclosure relates to data processing systems incorporating non-volatile memory.

Description

It is known to provide data processing systems that utilize interconnect circuitry to provide a plurality of memory transaction paths between one or more transaction masters and one more transaction slaves. An example of such interconnect circuitry is interconnect circuitry built in accordance with the Advanced High-performance Bus (AHB) design specification produced by ARM Limited of Cambridge, England. Within such systems, it is possible to provide non-volatile memory for storing data as one of the one or more transaction slaves. At least some forms of non-volatile memory require a relatively large amount of energy to read and support a relatively slow read speed. This can increase energy consumption and reduce operation speed, for example, when attempting to use such non-volatile memories as execute-in-place memories from which program instructions are directly fetched by a processor.

SUMMARY

At least some embodiments of the present disclosure provide apparatus for processing data comprising:
interconnect circuitry to provide a plurality of memory transaction paths between one or more transaction masters and one or more transaction slaves; wherein
said one or more transaction slaves comprise a non-volatile memory to store data; and further comprising
a cache memory disposed in a memory transactions path between said interconnect circuitry and said non-volatile memory to cache data read from said non-volatile memory.

At least some embodiments of the present disclosure provide apparatus for processing data comprising:
interconnect means for providing a plurality of memory transaction paths between one or more transaction masters and one or more transaction slaves; wherein
said one or more transaction slaves comprise non-volatile memory means for storing data; and further comprising
cache memory means disposed in a memory transactions path between said interconnect means and said non-volatile memory means for caching data read from said non-volatile memory means.

At least some embodiments of the present disclosure provide a method of processing data comprising:
providing a plurality of memory transaction paths via interconnect circuitry between one or more transaction masters and one or more transaction slaves; wherein
said one or more transaction slaves comprise a non-volatile memory to store data; and further comprising
caching data read from said non-volatile memory in a cache memory disposed in a memory transactions path between said interconnect circuitry and said non-volatile memory.

The above, and other objects, features and advantages of this disclosure will be apparent from the following detailed description of illustrative embodiments which is to be read in connection with the accompanying drawings.

DRAWINGS

Figure 2:
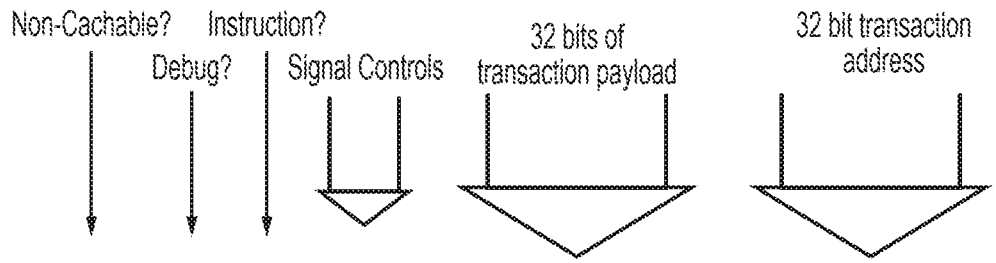
Figure 3:
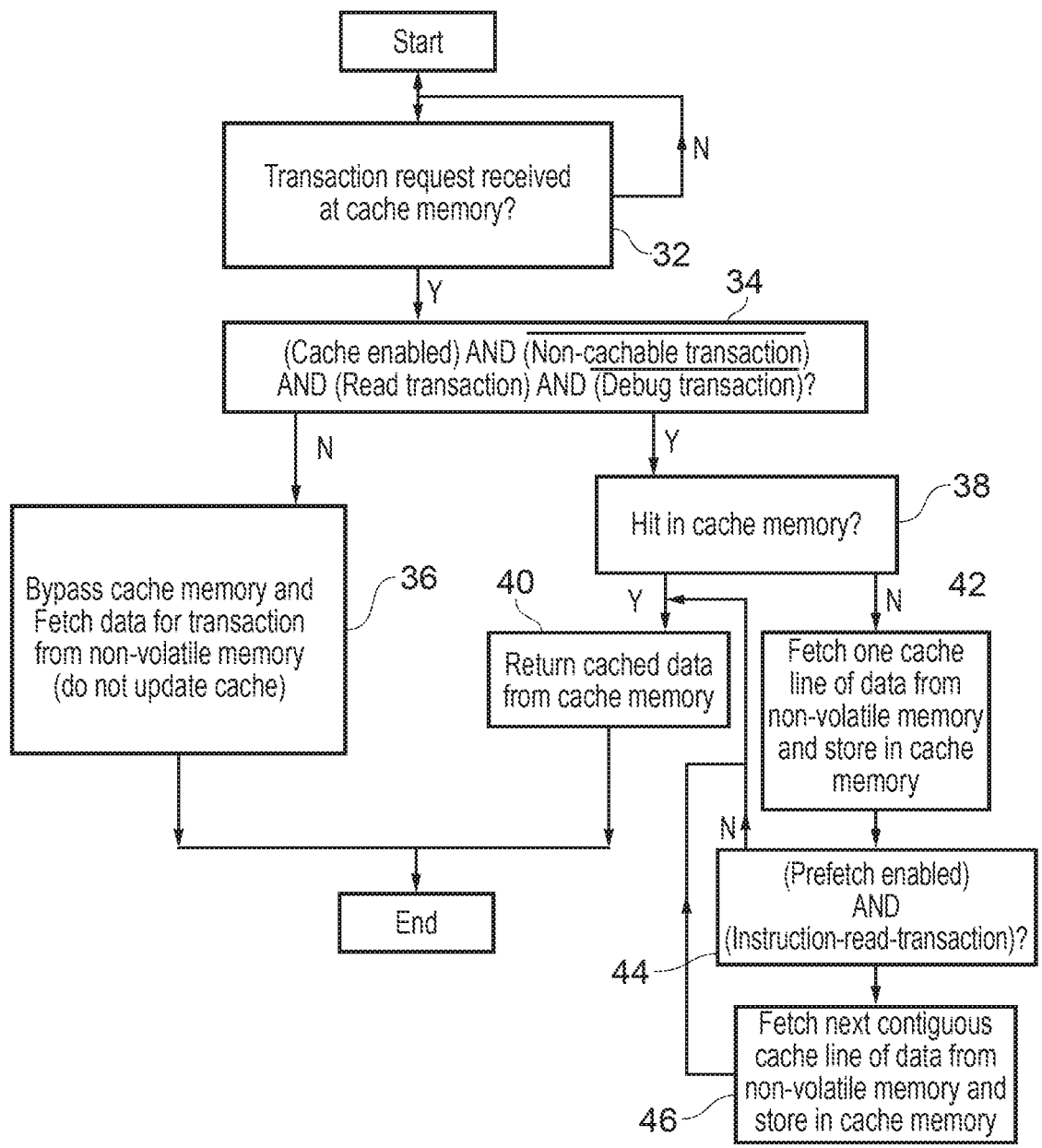

FIG. 1 schematically illustrates a data processing system incorporating a processor serving as one of a plurality of transaction masters coupled via interconnect circuitry to a plurality of transaction slaves including a non-volatile memory;

FIG. 2 schematically illustrates signals routed through one of a plurality of memory transaction paths between a transaction master and a transaction slave by the interconnect circuitry; and FIG. 3 is a flow diagram schematically illustrating operation of a cache memory disposed between the interconnect circuitry and the non-volatile memory within the system of FIG. 1.

EMBODIMENTS

FIG. 1 schematically illustrates a data processing system 2 comprising a plurality of transaction masters including a processor 4, debugging circuitry 6 and DMA circuitry 8 all connected via interconnect circuitry 10 to a plurality of transaction slaves. The plurality of transaction slaves include a non-volatile memory 12, such as provided by eFlash memory 14 in combination with a flash controller 16, as well as further transaction slaves in the form of a DRAM memory 18 and an input/output interface 20 for supporting memory mapped peripherals such as a keyboard 22, a communication interface 24 and/or a display (not illustrated).

It will be appreciated that eFlash is only one example of the type of non-volatile memory that may be used. Other examples include mask ROM, PROM, EPROM, EEPROM, nvSRAM, FeRAM, PRAM, CBRAM, NRAM, RRAM, and FJGRAM.

A cache memory 26 in the form of a two way set associative cache memory is provided between the interconnect circuitry 10 and the non-volatile memory 12. The cache memory 26 serves as a read-only memory and is bypassed by memory transactions received from the interconnect circuitry which include a signal indicating that those transactions are write transactions. Such write transactions are directly passed to the flash controller 16.

The cache memory 26 is coupled via a 32-bit AHB interface (AHB is an interconnect design specification of ARM Limited of Cambridge England). The 32-bit AHB interface supports the transfer of 32 bits of data in parallel between the interconnect circuitry 10 and the cache memory 26. More generally, the connection between the interconnect circuitry 10 and the cache memory 26 supports the transfer of N-bits of data in parallel, such as between one of the transaction masters (e.g. one of the processor 4, the debugging circuitry 6 and the DMA unit 8) and the cache memory 26. In the case of program instructions being fetched by the processor 4, these may comprise 32-bit program instructions or 16-bit program instructions, e.g. if the processor is an ARM processor, then the instructions may be 32-bit ARM instructions or 16-bit Thumb instructions. More generally, the processor 4 may serve to execute program instructions which are N-bit program instructions and/or N/2-bit program instructions.

When the processor 4 fetches a program instruction, the memory transaction transferred via the interconnect circuitry 10 includes an instruction-fetch signal which accompanies the memory transaction and identifies that the memory transaction concerned is an instruction-read transaction attempting to read a program instruction for execution. Such an instruction-fetch signal may modify the behavior of the cache memory 26 as will be discussed further below. The processor 4 may also serve to read data comprising literal data embedded within a program stored within the non-volatile memory 12 together with the program instructions as well as other data which may be stored, for example, in the DRAM memory 18.

In this example embodiment the cache memory 26 is coupled to the non-volatile memory 12 via a 128-bit AHB bus which serves to transfer in parallel 128 bits of data. More generally in this example embodiment, if the connection between the cache memory 26 and the interconnect circuitry 10 transfers in parallel N bits of data, then the connection between the cache memory 26 and the non-volatile memory 12 serves to transfer M*N bits of data in parallel, where M is an integer greater than one. The flash controller 16 is coupled to the eFlash memory 14 via a 128-bit input/output interface. It will be appreciated that the schematic drawing of FIG. 1 in this example concentrates upon the read interface to the non-volatile memory 12. In practice, a separate write interface may be provided to support what can be a distinct data writing mechanism, e.g. the nature of the non-volatile memory 12 may be such that data may only be written in complete pages and relatively slowly. In this example embodiment the non-volatile memory 12 is used to predominately store program instructions and literal data for controlling processing operations to be performed by the processor 4 although further read-only data, such as image data to be transferred to a display screen by the DMA unit 8, may also be storing in the non-volatile memory 12. The processing operations performed by the processor 4 are at least partially specified by the program instructions stored within the non-volatile memory 12 and may additionally be controlled by literal data (e.g. branch offsets) stored within the non-volatile memory 12 in some circumstances.

The cache memory 26 is in this example embodiment a two-way set associative cache memory, although in other embodiments, different forms of cache memory may also be used, such as, for example, a fully associative cache memory. The cache memory 26 comprises a plurality of cache lines 28. Each of these cache lines stores 128 bits of data read from the non-volatile memory 12. Thus, the cache line size within the cache memory 26 may be matched with the data path width between the cache memory 26 and the non-volatile memory 12. When a cache miss following a read transaction of target data occurs within the cache memory 26, then a cache fill operation is performed by the cache memory 26 to load at least one cache line of data which includes the target data. As will be discussed further below, if the read operation was marked by the instruction-fetch signal previously discussed as corresponding to a program instruction, and prefetching by the cache memory 26 has been enabled, then the cache fill operation may additionally load one or more further cache lines of data contiguous with and following within the memory address space of the non-volatile memory 12 the cache line of data which includes the target data. Thus, when a cache miss occurs in respect of an attempted fetch of a program instruction, then multiple cache lines within the cache memory 26 may be loaded with data from the non-volatile memory 12 in order to increase the likelihood that program instructions which will subsequently be required by the processor 4 will be present within the cache memory 26 when the processor 4 attempts to read those program instructions This can reduce the likely delay in returning a program instruction to the processor 4. More particularly, if the processor 4 operates at a clock speed such that its maximum instruction consumption rate is X Hertz, then the transaction rate supported between the non-volatile memory 12 and the cache memory 26 may be ≥X/M Hertz where M is the ratio of the width of the data path between the cache memory 26 and the non-volatile memory 12 compared with the data path width between the interconnect 10 and the cache memory 26. The energy consumed in reading four 32 bit words from eFlash as separate read operations may, in some example embodiments, be 1.2 times the energy consumed in reading 128 bits at the same time. Thus, for example, if the maximum instruction consumption rate of the processor 4 is 150 MHz, and the ratio between the sizes of the data paths is 4:1, then the transaction rate supported between the non-volatile memory 12 and the instruction cache 26 may be 40 MHz whilst maintaining a relatively low likelihood of the processor 4 being stalled awaiting instructions to be fetched from the non-volatile memory 12. It will be appreciated that these numbers and ratios are only given by way of example and different frequencies and/or size ratios of the data paths may be employed in different embodiments.

The memory transactions transferred via the interconnect circuitry 10 may include a plurality of other signals identifying various characteristics associated with those memory transactions. These characteristics can take a wide variety of different forms. Included within these characteristics are signals within the memory transactions comprising a debug signal accompanying a memory transaction and identifying that memory transaction as originating from the debug circuitry 6, and a non-cacheable signal accompanying a memory transaction and identifying that memory transaction as a non-cacheable transaction seeking to access non-cacheable data which it is inappropriate to store within a cache memory of the data processing system 2.

The debug signal may be used by the cache memory to control bypassing of the cache memory 26 for any memory transaction which is identified by the debug signal as originating from the debugging circuitry 6. Thus, the debugging circuitry 6 is able to directly access the non-volatile memory 12 and its actions do not have any effect upon the content of the cache memory 26.

The cache memory 26 may also be responsive to the non-cacheable signal accompanying a memory transaction to bypass operation of the cache memory 26 in respect of any memory transactions seeking to access non-cacheable data. Thus, non-cacheable data may be stored within the non-volatile memory 12 and can be directly accessed by any of the transaction masters 4, 6, 8 without the involvement of the cache memory 26.

A plurality of flags 30, which are software programmable under control of program instructions executed by the processor 4, are associated with the cache memory 26. These flags may include a disable flag which serves to disable the entire operation of the cache memory 26 if this is desired. In this circumstance, all memory transactions bypass the cache memory 26 and the data processing system 2 operates as if the cache memory 26 were not present. A further flag provided is a software programmable prefetch disable flag. If this prefetch disable flag is set, then the action of the cache memory 26 to prefetch additional cache lines of data when a cache fill operate is performed subsequent to a miss corresponding to an instruction fetch occurs is disabled.

Thus, the prefetching of additional cache lines can be enabled and disabled under software programmable control by the processor 4.

It will be appreciated that in the above discussion the action of the cache memory 26 in relation to the fetching of program instructions by the processor 4 has been given emphasis. However, the action of the cache memory 26 is also to cache data in respect of memory transactions which may be received from other transaction masters (not including the debugging circuitry 6 as previously discussed), such as the DMA unit 8. The cache memory 26 thus serves to cache data to be read from the non-volatile memory 12 irrespective of whether that data is program instructions, literal data embedded within program code or more general purpose data.

FIG. 2 schematically illustrates a selection of the signals comprising a memory transaction transferred by the interconnect circuitry 10 between a transaction master 4, 6, 8 and a transaction slave 12, 18, 20. In this example, some of the signals of a 32-bit AHB bus are illustrated and include a 32-bit transaction address indicating a memory location within the memory address space of the system 2 that is the target of the memory transaction. The memory transaction also includes 32 bits of transaction payload data corresponding to the data to be transferred. This may be write data accompanying a write transaction from a transaction master to a transaction slave, or read data returned by a transaction slave to a transaction master. As will be familiar to those in this technical field, the address and payload data is accompanied by a plurality of control signals for controlling various aspects of transaction transfer, e.g. handshaking, routing, read/write identification etc. Also illustrated in FIG. 2 are the instruction-fetch signal, the debug signal and the non-cacheable signals previously discussed. These particular signals are used as part of the control of the cache memory 26.

FIG. 3 is a flow diagram schematically illustrating operation of the cache memory 26. At step 32 processing waits until a transaction request is received at the cache memory. Step 34 then determines whether a combination of conditions associated with the received transaction request and the system state indicate that cache memory should be bypassed or a lookup should be made within the cache memory 26. More particular, step 34 determines a Boolean AND of signals indicating whether the cache 26 is enabled (e.g. the disable flag is not set), the transaction is not marked as non-cacheable (i.e. the transaction is cacheable), the transaction is a read transaction and the transaction is not a debug transaction. If any of these conditions is false, then processing proceeds to step 36 whereby the cache memory 26 is bypassed and the data for the transaction is fetched directly from the non-volatile memory 12. In this case, there is no update of the state of the cache memory 26.

If all of the conditions of step 34 are true, then processing proceeds to step 38 at which a cache lookup operation is performed within the two way set associative cache memory 26 to determine whether there is a hit in the cache memory. If there is a hit in the cache memory 26, then step 40 returns the cache data from the cache memory 26 to service the transaction request received at step 32. If there is a miss in the cache memory 26 identified in step 38, then processing proceeds to step 42 at which a cache fill operation is performed fetching one line of cache data from the non-volatile memory 12 which includes the target data of the read being performed by the transaction received at step 32. This cache line of data is then stored into the cache memory 26. It will be noted that the action of the determination at step 34 is such that in this example embodiment only read transactions are passed to the cache memory 26 and all write transactions will bypass the cache memory 26 via step 36 (and be handled by a separate write mechanism, e.g. one supporting buffered page writes).

Following step 42, processing proceeds to step 44 where a determination is made as to prefetching is enabled (e.g. prefetching is not disabled) in combination with the instruction-fetch signal which accompanies the transaction received at step 32 indicating that the transaction which has been received is an instruction-read transaction attempting to read a program instruction to be executed by the processor 4. If both of these conditions are not true, then processing passes to step 40. If both of these conditions are true, then a prefetch operation is performed by step 46 at which a next contiguous cache line of data from the non-volatile memory 12 is fetched and stored into the cache memory 26 prior to processing again returning to step 40. In some example embodiments, the prefetched line may be stored in a temporary buffer and saved into the cache memory 26 on the first hit to this temporary buffer.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data, comprising:
interconnect circuitry to provide a plurality of memory transaction paths between one or more transaction masters and one or more transaction slaves; wherein:
said one or more transaction slaves comprise a non-volatile memory to store data, and
said one or more transaction masters comprise a processor to perform processing operations at least partially specified by program instructions stored in said non-volatile memory; and further comprising
a cache memory disposed in a memory transaction path between said interconnect circuitry and said non-volatile memory to cache data read from said non-volatile memory, wherein:
said cache memory is responsive to a non-cacheable signal accompanying a memory transaction and identifying that said memory transaction is a non-cacheable transaction to non-cacheable data to bypass operation of said cache memory in servicing said non-cacheable transaction.

2. The apparatus as claimed in claim 1, wherein said cache memory is a read-only cache memory.

3. The apparatus as claimed in claim 1, wherein said cache memory is an associative cache memory.

4. The apparatus as claimed in claim 3, wherein said associative cache memory is two way set associative.

5. The apparatus as claimed in claim 1, wherein said interconnect circuitry provides a memory transaction path to transfer N bits of data in parallel between said processor and said cache memory.

6. The apparatus as claimed in claim 1, wherein said program instructions comprise at least one of N-bit program instructions and N/2-bit program instructions.

7. The apparatus as claimed in claim 5, wherein said cache memory is coupled to said non-volatile memory via a cache interface to transfer in parallel M*N bits of data from said non-volatile memory to said cache memory, and M is an integer greater than one.

8. The apparatus as claimed in claim 7, wherein said cache memory comprises a plurality of cache lines each storing M*N bits of data.

9. The apparatus as claimed in claim 1, wherein said cache memory comprises a plurality of cache lines and is responsive to a cache miss corresponding to a memory transaction attempting to read target data from said cache memory to perform a cache fill operation to load a cache line of said plurality of cache lines with data including said target data.

10. The apparatus as claimed in claim 9, wherein said cache memory is responsive to an instruction-fetch signal accompanying said memory transaction and identifying that said memory transaction is an instruction-read transaction attempting to read a program instruction to perform a prefetch cache fill operation to load at least one further cache line of said plurality of cache lines with data from said non-volatile memory contiguous with and following in a memory address space of said non-volatile memory said cache line of data including said target data.

11. The apparatus as claimed in claim 10, wherein said cache memory is responsive to a software controlled parameter to disable said prefetch cache fill operation of said cache memory.

12. The apparatus as claimed in claim 1, wherein said plurality of transaction masters include debugging circuitry, said cache memory is responsive to a debug signal accompanying a memory transaction and identifying that said memory transaction is a debug transaction issued by said debugging circuit to bypass operation of said cache memory in servicing said debug transaction.

13. The apparatus as claimed in claim 7, wherein said one or more transaction masters comprise a processor to perform processing operations at least partially specified by program instructions stored in said non-volatile memory and said processor executes said program instructions at a maximum rate of X Hertz and said non-volatile memory supports said transfer of said M*N bits of program instruction data to said cache memory at rate of at least X/M Hertz.

14. The apparatus as claimed in claim 1, comprising a plurality of transaction slaves mapped to different regions within a memory address space.

15. The apparatus as claimed in claim 1, wherein said non-volatile memory is an execute-in-place memory.

16. The apparatus as claimed in claim 1, wherein said non-volatile memory is one of:
eFlash memory, mask ROM, PROM, EPROM, EEPROM, nvSRAM, FeRAM, PRAM, CBRAM, NRAM, RRAM, and FJGRAM.

17. Apparatus for processing data comprising:
means for providing a plurality of memory transaction paths between one or more transaction masters and one or more transaction slaves; wherein:
said one or more transaction slaves comprise means for storing data, and
said one or more transaction masters comprise a processor to perform processing operations at least partially specified by program instructions stored in said non-volatile memory; and further comprising:
means, disposed in a memory transaction path between said means for providing and said means for storing data, for caching data read from said means for storing data,
wherein:
said means for caching data is responsive to a non-cacheable signal accompanying a memory transaction and identifying that said memory transaction is a non-cacheable transaction to non-cacheable data to bypass operation of said means for caching data in servicing said non-cacheable transaction.

18. A method of processing data, comprising:
providing a plurality of memory transaction paths via interconnect circuitry between one or more transaction masters and one or more transaction slaves; wherein:
said one or more transaction slaves comprise a non-volatile memory to store data, and
said one or more transaction masters comprise a processor to perform processing operations at least partially specified by program instructions stored in said non-volatile memory; and further comprising
caching data read from said non-volatile memory in a cache memory disposed in a memory transaction path between said interconnect circuitry and said non-volatile memory, wherein:
said cache memory is responsive to a non-cacheable signal accompanying a memory transaction and identifying that said memory transaction is a non-cacheable transaction to non-cacheable data to bypass operation of said cache memory in servicing said non-cacheable transaction.

* * * * *